(12) United States Patent
Grimm et al.

(10) Patent No.: US 7,241,822 B2
(45) Date of Patent: Jul. 10, 2007

(54) DYE COMPOSITION FOR DYEING POWDER COATINGS

(75) Inventors: Felix W. Grimm, Hofheim (DE); Klaus Kund, Langenscheid (DE); Wolfgang Winter, Eschborn (DE); Willi Rauschmann, Frankfurt am Main (DE); Bernd Nestler, Shizuoka Pref. (JP)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 0 days.

(21) Appl. No.: 10/487,789

(22) PCT Filed: Aug. 1, 2002

(86) PCT No.: PCT/EP02/08580

§ 371 (c)(1),
(2), (4) Date: Aug. 23, 2004

(87) PCT Pub. No.: WO03/020831

PCT Pub. Date: Mar. 13, 2003

(65) Prior Publication Data

US 2005/0004291 A1    Jan. 6, 2005

(30) Foreign Application Priority Data

Aug. 30, 2001  (DE) ............ 101 42 382

(51) Int. Cl.
*C08K 5/22* (2006.01)
*C08K 3/30* (2006.01)

(52) U.S. Cl. .......... 524/191; 524/190; 524/423; 524/599; 106/461; 106/471

(58) Field of Classification Search ........ 524/423, 524/191
See application file for complete search history.

(56) References Cited

U.S. PATENT DOCUMENTS

| | | | |
|---|---|---|---|
| 3,201,051 A * | 8/1965 | Manger et al. ............ 241/22 |
| 3,790,513 A | 2/1974 | Victorius | |
| 4,320,048 A | 3/1982 | Harmuth | |
| 4,894,093 A | 1/1990 | Aderhold et al. | |
| 5,629,367 A * | 5/1997 | Lofftus et al. ............ 524/88 |
| 5,635,548 A * | 6/1997 | Kittle et al. ............ 523/220 |
| 5,989,129 A | 11/1999 | O'Neill | |
| 6,063,182 A | 5/2000 | Babler | |
| 6,268,088 B1 | 7/2001 | Oh et al. | |
| 6,432,185 B1 | 8/2002 | Bauer et al. | |
| 2003/0180624 A1 | 9/2003 | Oh et al. | |
| 2003/0180625 A1 | 9/2003 | Oh et al. | |
| 2003/0198869 A1 | 10/2003 | West et al. | |

FOREIGN PATENT DOCUMENTS

| | | |
|---|---|---|
| DE | 1923256 | 11/1970 |
| DE | 3718277 | 12/1988 |
| DE | 4101048 | 7/1992 |
| EP | 0702055 | 3/1996 |
| EP | 0702063 | 3/1996 |
| EP | 0845504 | 11/1997 |
| GB | 946053 | 1/1964 |
| GB | 1310756 | 3/1973 |
| WO | WO 91/13931 | 9/1991 |
| WO | WO 03/083970 A1 | 10/2003 |
| WO | WO 03/083971 A1 | 10/2003 |
| WO | WO 03/083972 A1 | 10/2003 |
| WO | WO 03/083973 A1 | 10/2003 |
| WO | WO 03/083974 A1 | 10/2003 |
| WO | WO 03/090299 A1 | 10/2003 |

OTHER PUBLICATIONS

W. Xu et al., Structures of Orthoborate Anions and Physical Properties of Their Lithium Salt Nonaqueous Solutions, Journal of the Electrochemical Society, 2003, 1-0, 150(1).

W. Xu et al., Structures of Othoborate Anions and Physical Properties of Their Lithium Salt Nonaqueous Solutions, Journal of the Electrochemical Society, 2003, 1-0, 150(1).

Z. Zhang et al., Cross-Linked Network Polymer Electrolytes Based on a Polysiloxane Backbone with Oligo(oxyethylene) Side Chains: Synthesis and Conductivity, Macromolecules, Oct. 28, 2003, vol. 36, No. 24, 9176-9180.

English Translation of IPER for PCT/EP02/06560, Mar. 12, 2004.

* cited by examiner

*Primary Examiner*—Vasu Jagannathan
*Assistant Examiner*—Vickey Ronesi
(74) *Attorney, Agent, or Firm*—Anthony A. Bisulca

(57) ABSTRACT

The invention relates to a powdery dye composition consisting essentially of C.I. Pigment Red 170 (C.I. No. 12475) and barium sulfate, wherein the barium sulfate is added before or during the production process of the C.I. Pigment Red 170. The inventive addition of barium sulfate enables non-homogeneities and caking to be avoided in the mixture.

8 Claims, No Drawings

DYE COMPOSITION FOR DYEING POWDER COATINGS

The invention relates to an organic-inorganic colorant composition comprising barium sulfate and C.I. Pigment Red 170 and to its use for coloring powder coating materials.

The preparation of powder coating materials is known and consists essentially, as described in Farbe und Lack, 1986, 92, 734–737, of three process steps. First of all the constituents of the powder coating material, such as binders, curing agents, colorants, and fillers, for example, and also, where appropriate, auxiliary and additives, such s surfactants, pigmentary and nonpigmentary dispersants, standardizers, resins, waxes, defoamers, antidust agents, extenders, preservatives, rheology control additives, wetting agents, antioxidants, UV absorbers, light stabilizers, antistats, devolatilizers, lubricants or a combination thereof, for example, are weighed out in accordance with the formula of the powder coating material, metered into a premix apparatus, and carefully mixed. In a second step the premix is supplied continuously to an extruder and is melted and homogenized and the solid constituents are dispersed by shearing. In the final step the melt, following its emergence from the extruder, is cooled rapidly in order to stop or prevent the reaction between binder and curing agent. The extrudate is subsequently ground to the desired particle size distribution of the powder coating material.

This known and widely employed process has disadvantages particularly in the first two steps. Thus during preparation of the premix and during homogenization in the extruder, inhomogeneities in the mixture and also instances of caking are frequent occurrences. This results in fluctuations in quality and in inhomogeneities in the finished powder coating material. A further disadvantage is the increased wear of the premix apparatus and of the extruder owing to the greater mechanical load imposed by such inhomogeneities and agglomerations. Another great disadvantage lies in the partial loss of the raw materials used. The increased cleaning effort is also considered a disadvantage.

In order to overcome the stated disadvantages, modified processes are employed in part for the first process step, i.e., the premixing of the individual constituents of the powder coated material, and in part for the second process step, i.e., that of melting, homogenizing, and dispersing in the extruder. Some processes feature modification of both process steps in order to optimize powder coating preparation.

Thus, for example, DE-A-4 101 048 describes a modified process for preparing a powder coating material, in which the binder component and curing component are premixed, supplied continuously to the extruder, and melted in the extruder. Pigments, fillers, and further constituents are premixed separately and metered into the extruder at the end of the melting zone or in the downstream homogenizing and/or dispersing zone.

A disadvantage with this process for the powder coatings manufacturer is that a second premix apparatus is required and in effect a further process step is implemented, giving rise to costs through additional requirement for space, time, and capital. A further disadvantage of the process cited is that even with the separate premixing of pigment, fillers, and any further constituents it is possible for inhomogeneities and instances of caking to occur.

U.S. Pat. No. 3,790,513 discloses a process for dispersing all constituents of the powder coating material in an organic solvent and supplying this mixture to a vacuum extruder. As a result of supply of heat and application of a vacuum, first of all the organic solvent is evaporated, and subsequently the mixture is homogenized and dispersed by melt extrusion. Disadvantages associated with this process are the costly evaporation of the organic solvent and the additional technical complexity this procedure necessitates.

U.S. Pat. No. 4,320,048 describes a process in which all of the components of the powder coating material except for the colorant are premixed and supplied to the extruder. The colorant is fed to the extruder separately from this premix, in the form of a dispersion and containing up to 60% by weight of an organic solvent, and then in the extruder is mixed with the other components. Although this process requires a quantity of solvent which is lower in percentage terms, in respect of the finished powder coating material, than that described in U.S. Pat. No. 3,790,513, the need to remove the solvent from the powder coating mixture is a disadvantage here as well.

WO 91/13931 describes a process for preparing pigment concentrates (masters) and the suitability thereof for coloring powder coating materials. The master is prepared from a mixture of colorant(s), optionally filler(s), wetting agent(s), polymer vehicle(s), and, where appropriate, further additive(s) in an "adiabatic" high-speed mixer, the composition being melted as a result of the frictional heat produced and being homogenized and dispersed. Such masters can be used as colorants for preparing powder coating materials, the powder coating being observed to have an improved homogeneity, a greater color strength, and an improved leveling and gloss compared to the conventional incorporation of the colorant. A disadvantage here is that an additional process step is needed, namely the preparation of the master in an additional apparatus, a specialty high-speed mixer. This has disadvantageous consequences for the costs and time required for powder coating preparation. A further disadvantage is that a colorant product of this kind includes a multiplicity of additives, whose effect on the powder coating manufacturer's coating systems is unpredictable.

Organic-inorganic colorant preparations are known, for example, from EP 0 702 055, EP 0 702 063 and EP 0 845 504. The pigment products described therein, with natural and synthetic silicates as inorganic filling material, are indeed referred to as "stir-in" pigments, but do not meet the requirements already described with regard to the premix on incorporation into powder coating systems. Examples given of natural and synthetic silicates include mica, kaolin, and talc.

Pigment Red 170 (C.I. 12475) is one of the major colorants for pigmenting powder coating materials in the neutral red range. In addition to its heat resistance it has the particular feature of outstanding fastness to blooming in powder coating systems. Because of their tendency to bloom, for example, the more yellow-toned Pigment Red 112 (C.I. 12370) has only limited suitability, and Pigment Red 3 (C.I. 12120) no suitability at all, for this area of application. Other pigments which are likewise similar coloristically to Pigment Red 170 are incapable of unrestrictedly replacing this pigment in powder coating systems, owing to other important performance properties, such as deficient fastness in exterior application, poor hiding power or inadequate color strength, for example.

From experience, however, it is known that with Pigment Red 170 in particular there are instances of inhomogeneity and caking to a high degree when the pigment is incorporated into powder coating systems, particularly in connection with the preparation of the premix.

It is an object of the present invention, then, to provide a material which comprises essentially Pigment Red 170 and which can be incorporated into powder coating systems by simple mixing in a premix apparatus without causing inhomogeneities or instances of caking. It is a further object of the invention to provide this material as inexpensively as possible, i.e., without additional process steps in comparison to conventional pigment powders. Moreover, the material ought to minimize the cleaning effort associated with a change of shade in the premix apparatus, and also its wear.

It has now been found that this object, surprisingly, has been achievable by defined addition of barium sulfate to Pigment Red 170.

The present invention provides a powderous colorant composition consisting essentially of C.I. Pigment Red 170 (C.I. No. 12475) and barium sulfate, the latter having been added before or during the operation of preparing C.I. Pigment Red 170.

The additive is added during any desired operating step which is to be run through during pigment preparation, and produces as a result a pigment preparation which, unlike a dry mix of the finished pigment with barium sulfate, can be incorporated directly into powder coating systems without problems and without introduction of further operating steps.

The operation of preparing the pigment normally embraces its synthesis, i.e., diazotization of 4-carbamoylaniline and coupling of the diazonium salt with 3-hydroxy-N-(2'-ethoxyphenyl)-2-naphthoamide, its isolation as a presscake, and the cleaning thereof by washing, optionally the pasting or slurrying of the washed presscake, finishing of the resultant suspension by thermal treatment, isolation of the finished presscake and the cleaning thereof by washing, and, where appropriate, granulation of the finished and washed presscake. This is followed by drying of the granules and grinding thereof to the pigment powder. The barium sulfate is added prior to this drying step, at the latest. By way of example the barium sulfate can be added before or during pigment synthesis or immediately before or during a subsequent finish. The barium sulfate can also of course be added in portions at different times.

By finishing the skilled worker means a thermal aftertreatment of the moist crude pigment, obtained after synthesis, in a finished medium, e.g., in water, an organic solvent or a mixture of water and organic solvent, it being necessary for the water and the organic solvent to be miscible with one another neither at room temperature nor at any other temperature, in order to produce a particle size distribution and/or crystal form and/or crystal polymorph that is specific for the application. Temperatures arising in this operation may range, for example, from 0 to 200° C.

The barium sulfate is preferably added immediately before or after the finish in an aqueous, aqueous-alkaline, aqueous-acidic, aqueous-organic or organic medium. The barium sulfate can also be added to the water-moist presscake prior to drying and incorporated, in which case the barium sulfate can itself be used likewise in dry form or in the form of a water-moist presscake.

The proportions between pigment and barium sulfate can vary within wide ranges.

Advantageously the colorant composition of the invention consists of from 60% to 99% by weight, preferably from 70% to 95% by weight, and very preferably from 80% to 90% by weight of C.I. Pigment Red 170 and from 1% to 40% by weight, preferably from 5% to 30% by weight, and very preferably from 10% to 20% by weight of barium sulfate.

The colorant preparation of the invention advantageously possesses a unimodal primary particle size distribution ($D_{50\%}$), as determined by evaluating transmission electron micrographs, of between 0.1 µm and 1.5 µm, preferably between 0.15 µm and 0.40 µm.

The present invention also provides a process for preparing the colorant composition of the invention, which comprises adding barium sulfate before or during the operation of preparing C.I. Pigment Red 170, and homogenizing the mixture.

In order to achieve sufficient premixing or predispersing of the Pigment Red 170 in the binder of the powder coating material and in order to obtain optimum performance properties, the barium sulfate ought to have an average particle size ($d_{50}$) of from 10 to 0.1 µm. Preference is given to barium sulfates having an average particle size of from 5 to 0.5 µm, more preferably those having an average particle size of from 1.5 to 0.7 µm.

The pigment preparations of the invention feature outstanding coloristic and rheological properties, in particular an outstanding rheology, high transparency and brightness, and great ease of dispersing. They are especially suitable for use in powder coating materials, but also as colorants for contactless printing techniques, such as in electrophotographic toners and ink-jet inks, for example.

The pigment preparation of the invention can be used in any proportion necessary for the coloring of powder coating materials. In respect of the material to be colored it is usual to use from 0.1% to 30% by weight, preferably from 0.5% to 20% by weight and very preferably from 1% to 10% by weight of the pigment preparation of the invention.

For the coloring of a powder coating mixture the pigment preparation of the invention can be used on its own. In order to produce different shades or color effects it is also possible to add further colorants, such as white, colored or black pigments, for example, and also effect pigments, to the powder coating mixture.

Binders used for powder coating materials are typically epoxy resins, optionally carboxyl- and/or hydroxyl-containing polyester resins, polyurethane resins, and acrylic resins, together with the usual curing agents. Combinations of resins are also employed. For example, epoxy resins are frequently used in combination with carboxyl- and hydroxyl-containing polyester resins. Typical curing components (preferably from 3% to 10% by weight, based on the resin) are, for example, acid anhydrides, imidazoles, and also dicyandiamide and its derivatives, blocked isocyanates, bisacylurethanes, phenolic and melamine resins, triglycidyl isocyanurates, oxazolines, and dicarboxylic acids.

The present invention further provides a powder coating formulation comprising the pigment preparation of the invention and also a customary binder.

Preference is given to powder coating materials consisting essentially of from 0.1% to 30% by weight, in particular from 0.5% to 20% by weight, more preferably from 1% to 10% by weight, of the pigment preparation of the invention, from 45% to 80% by weight, in particular from 50% to 70% by weight, more preferably from 55% to 65% by weight, of a binder (including curing agent) from the group consisting of epoxy resins, polyester resins, polyurethane resins, acrylate resins, or a combination of these resins, and from 0% to 50% by weight of further additives, such as, for example, shading colorants, surfactants, fillers, charge control agents for controlled setting of the electrostatic charge, dispersants, standardizers, waxes, defoamers, antidust agents, extenders, preservatives, rheology control additives, wetting agents, antioxidants, UV absorbers, light stabilizers, antistats, lubricants or devolatilizers.

The invention additionally provides a process for preparing a powder coating formulation, which comprises mixing the pigment preparation of the invention, the binder, and, where appropriate, the additives, extruding the mixture, and cooling and grinding the extrudate.

The powder coating formulations of the invention may be triboelectrically or electrokinetically sprayable powder coating materials and may be employed for coating the surfaces of articles made from, for example, metal, wood, plastic, glass, ceramic, concrete, textile material, paper or rubber (J.F. Hughes, "Electrostatic Powder Coating" Research Studies, John Wiley & Sons, 1984).

In order to assess the properties of the pigment preparations in the powder coatings sector the pigment preparations were incorporated into a polyester/TGIC binder system; first of all the various constituents of the powder coating material, i.e., PE/TGIC Crylcoat, leveling agents, devolatilizers, fillers, and the pigment preparation of the invention, were mixed in a high-speed mixer (e.g., Mixaco Container Mixer LAB CM) for 180 seconds. Thereafter a visual assessment was made of the degree of caking and deposits, and the effort required to clean the mixer was also assessed.

Assessment of the coloristic properties of the pigment preparations took place in an alkyd-melamine resin varnish (AM 5) and following incorporation into a polyester/TGIC binder system, dispersion of the mixture in a kneading apparatus, grinding of the extrudate, classification by sieving, spraying of the powder coating mixture onto a substrate, and formation of a uniform coating film by thermal crosslinking at 200° C.

The particle size distributions (primary particles) of the products were determined by visual analysis of transmission electron micrographs of the sample in question.

The particle size distributions of the inorganic substances used were taken from the product description of the respective manufacturer.

In the examples below parts are in each case parts by weight and percentages in each case percentages by weight. "min" are minutes.

EXAMPLE 1a 3 600 parts of aqueous finish suspension containing approximately 273 parts of C.I. Pigment Red 170 are admixed with 67.5 parts of synthetic barium sulfate (®Blanc Fixe HD 80 from Solvay Soda GmbH, Rheinberg) having an average particle diameter ($d_{50\%}$) of 1 μm and the suspension is stirred for 10 min and then adjusted to pH>11.0 using 33% strength sodium hydroxide solution. The bright red product is filtered, washed with water, dried in a forced air cabinet at 100° C., and finally ground using a laboratory mill, with cooling. This gives approximately 340 parts of a pigment preparation which in the AM 5 varnish produces transparent ultraclean coatings of high color strength. Determination of the primary particle size distribution reveals a mean particle size ($d_{50\%}$) of 0.235 μm.

EXAMPLE 1b 61.83 parts of ®Crylcoat 2988 (carboxylated polyester resin), 4.65 parts of ®Araldit PT 810 (TGIC curing agent), 3.32 parts of ®Additol XL 496 (leveling agent), 0.20 parts of benzoin (devolatilizer), 20.00 parts of Blanc Fixe N ($BaSO_4$), 5.00 parts of titanium dioxide Kronos 2310 (filler), and 5.00 parts of pigment preparation prepared in accordance with example 1a are weighed into a vessel and subsequently introduced into a high-speed laboratory mixer. Mixing is then carried out at 2 000 rpm for 3 min, without cooling. Inspection after the mixer has been emptied shows that there are virtually no deposits on the vessel wall or on the mixing paddle. Cleaning of the mixer is easy and quick.

EXAMPLE 2 (COMPARATIVE EXAMPLE)

The procedure of example 1b is repeated, but using as colorant 5.00 parts of standard commercial C.I. Pigment Red 170 instead of the pigment preparation described under example 1a. Inspection after mixing reveals severe deposits and sticking on the walls of the mixer and on the mixing paddle itself. Cleaning of the high-speed laboratory mixer is laborious and time-consuming.

EXAMPLE 3a (COMPARATIVE EXAMPLE)

A mixture of 1 500 parts of water and 80 parts of 80% strength acetic acid is cooled with ice to 10° C. and admixed with a hydrochloric acid solution of 126.4 parts of 4-carbamoylbenzenediazonium hydrochloride and small amounts of sodium nitrite. The excess nitrite is destroyed using amidosulfonic acid. Subsequently a clarified solution of 244.4 parts of 3-hydroxy-N-(2'-ethoxyphenyl)-2-naphthoamide and 156.4 parts of a 33% strength sodium hydroxide solution in 1 500 parts of water is added dropwise over the course of 120 min. When coupling is complete stirring is continued for 30 min and then the pH is adjusted with 173 parts of 31% strength hydrochloric acid and the reaction mixture is heated with steam to 98° C. After 4 h at this temperature it is cooled with water to 70° C., admixed with 204 parts of 33% strength sodium hydroxide solution, and stirred for a further 5 min, and the bright red solid is isolated by filtration. The filter cake is washed carefully with water, dried in a forced air cabinet at 120° C., and ground using an air jet mill.

EXAMPLE 3b (COMPARATIVE EXAMPLE)

1 410 parts of the pigment thus prepared are mixed mechanically with 340 parts of synthetic barium sulfate with an average particle size ($d_{50\%}$) of 1.0 μm (Blanc Fixe HD 80 from Solvay Soda GmbH, Rheinberg).

The resulting pigment preparation is incorporated in accordance with example 1b into a powder coating mixture. Examination reveals the formation of deposits which are greater than those of example 1b.

EXAMPLE 4

An acetate-buffered solution of 0.6 mol of 4-carbamoylbenzenediazonium hydro-chloride in water is admixed with stirring with 0.29 mol of synthetic barium sulfate (Blanc Fixe HD 80 from Solvay) having an average particle diameter ($d_{50\%}$) of 1 μm. Subsequently a clarified alkaline-aqueous solution of 0.65 mol of 3-hydroxy-N-(2'-ethoxyphenyl)-2-naphthoamide is run in over the course of 130 min. When coupling is complete stirring is continued for 15 min. The reaction suspension is filtered and washed with water. The intense-red presscake obtained is stirred together with water and made up to a volume of 3 600 ml. The suspension is adjusted to a pH of 3.8 using acetic acid and stirred at 102° C. for an hour. After this suspension has cooled to room temperature it is admixed with 30 ml of 33% strength sodium hydroxide solution and stirred for 30 min and then the red product is isolated by filtration. The presscake is washed with water, dried in a forced air cabinet at 100° C., and finally ground using a laboratory mill, with cooling. This gives 340 g of pigment preparation which in the AM 5 varnish gives transparent ultraclean coatings of high color strength.

EXAMPLE 5

1 421 parts of unfinished water-moist presscake containing 270 parts of C.I. Pigment Red 170 crude are diluted with water to a volume of 5 000 ml and the suspension is adjusted to a pH of 3.8 using 50% strength acetic acid, with stirring. Subsequently 76.5 parts of synthetic barium sulfate (Blanc Fixe HD 80 from Solvay Soda GmbH, Rheinberg) having an average particle diameter ($d_{50\%}$) of 1 μm are added and the mixture is homogenized for 10 min with stirring and then heated with low-pressure steam to 98° C. After 2 h a third of the suspension is withdrawn, cooled to 70° C. with water, and adjusted to a pH>10 using 33% strength sodium hydroxide solution. Stirring is continued for 10 min and then the bright red product is isolated by filtration, washed with water, dried in a forced air cabinet at 100° C., and finally ground using a laboratory mill, with cooling. This gives 80 g of a pigment preparation which in the AM 5 varnish gives transparent ultraclean coatings of high color strength.

EXAMPLE 6a 1 385 parts of unfinished water-moist presscake containing 270 parts of C.I. Pigment Red 170 crude are diluted with water to a solids concentration of approximately 7% and the suspension is adjusted to a pH of 3.8 using 80% strength acetic acid, with stirring. Thereafter the aqueous pigment suspension is heated to 105° C. with stirring and is held at this temperature for an hour. After the suspension has cooled it is admixed with 67.5 parts of synthetic barium sulfate having a mean particle diameter of 0.7 μm (Blanc Fixe Micro from Sachtleben Chemie, Duisburg) and homogenized for 10 min with stirring. The pH is adjusted to a level above 10 by addition of 33% strength sodium hydroxide solution and the suspension is stirred for 30 min more and finally is filtered. The bright red filter residue is carefully washed with water, dried at 100° C. in a forced air cabinet, and finally ground using an air jet mill. This gives a pigment preparation which in the AM 5 varnish gives transparent ultraclean coatings of high color strength. Determination of the primary particle size distribution reveals a mean particle size ($d_{50\%}$) of 0.230 μm.

EXAMPLE 6b 61.83 parts of Crylcoat 2988 (carboxylated polyester resin), 4.65 parts of Araldit PT 810 (TGIC curing agent), 3.32 parts of Additol XL 496 (leveling agent), 0.20 parts of benzoin (devolatilizer), 20.00 parts of Blanc Fixe N (filler), 5.00 parts of titanium dioxide Kronos 2310 (filler) and 5.00 parts of pigment preparation prepared in accordance with example 6a are weighed out into a vessel and subsequently introduced into a Mixaco Container Mixer LAB CM 3-D. These components are subsequently mixed at 2 000 rpm (dispersion paddle) or 330 rpm (mixing paddle) for 3 min without cooling. Inspection of the Mixaco mixer after it has been emptied reveals virtually no deposits on the container wall (mixing vessel), on the mixing paddle or on the dispersion paddle. Cleaning of the mixer is easy and quick. In comparison to a mixture prepared using standard commercial C.I. Pigment Red 170 the level of deposits formed is significantly lower.

EXAMPLE 7a (COMPARATIVE EXAMPLE)

The procedure of example 6a is repeated, but replacing the barium sulfate by 67.5 parts of Clay ASP-Ultrafine (Chemie-Mineralien GmbH & Co. KG, Bremen) having a mean particle diameter ($d_{50\%}$) of 0.2 μm. Determination of the primary particle size distribution reveals a mean particle size ($d_{50\%}$) of 0.262 μm.

EXAMPLE 7b

The pigment preparation obtained from example 7a is incorporated in accordance with example 6b into a powder coating mixture. Inspection after the Mixaco mixer has been emptied reveals a significantly greater level of deposits on the container wall (mixing vessel), on the mixing paddle, and on the dispersion paddle than when using the pigment preparation from example 6a.

EXAMPLE 8a (COMPARATIVE EXAMPLE)

The procedure of example 6a is repeated, but replacing the barium sulfate by 67.5 parts of chalk having a mean particle diameter of 2.7 μm (Millicarb-OG from Omya GmbH, Cologne). Determination of the primary particle size distribution reveals a mean particle size ($d_{50\%}$) of 0.251 μm.

EXAMPLE 8b (COMPARATIVE EXAMPLE)

The pigment preparation obtained from example 8a is incorporated in accordance with example 6b into a powder coating mixture. Inspection after the Mixaco mixer has been emptied reveals a significantly greater level of deposits on the container wall (mixing vessel), on the mixing paddle, and on the dispersion paddle than when using the pigment preparation from example 6a.

EXAMPLE 9a

The procedure of example 6a is repeated, but replacing the synthetic barium sulfate having a mean particle diameter of 0.7 μm (Blanc Fixe Micro from Sachtleben Chemie, Duisburg) by 67.5 parts of heavy spar having a mean particle diameter of 1.0 μm (Albawhite from Sachtleben Chemie, Duisburg). This gives a pigment preparation which in the AM 5 varnish gives transparent ultraclean coatings of high color strength. Determination of the primary particle size distribution reveals a mean particle size ($d_{50\%}$) of 0.246 μm.

EXAMPLE 9b

The pigment preparation obtained from example 9a is incorporated in accordance with example 6b into a powder coating mixture. Inspection after the Mixaco mixer has been emptied reveals only minimal deposits on the container wall (mixing vessel), on the mixing paddle, and on the dispersion paddle.

EXAMPLE 10a (COMPARATIVE EXAMPLE)

The procedure of example 6a is repeated, but replacing the barium sulfate by 67.5 parts of mica having a mean particle diameter of <2.0 μm (Mica SFG70 from Aspanger Bergbau and Mineralwerke GmbH, Aspang, Austria). Determination of the primary particle size distribution reveals a mean particle size ($d_{50\%}$) of 0.240 μm.

EXAMPLE 10b (COMPARATIVE EXAMPLE)

The pigment preparation obtained from example 10a is incorporated in accordance with example 6b into a powder coating mixture. Inspection after the Mixaco mixer has been emptied reveals a significantly greater level of deposits on the container wall (mixing vessel), on the mixing paddle, and on the dispersion paddle than when using the pigment preparation from example 6a.

EXAMPLE 11a (COMPARATIVE EXAMPLE)

The procedure of example 6a is repeated, but replacing the barium sulfate by 67.5 parts of talc having a mean particle diameter of 4.5 μm (Finntalc M 15 from Omya GmbH, Cologne). Determination of the primary particle size distribution reveals a mean particle size ($d_{50\%}$) of 0.268 μm.

EXAMPLE 11b (COMPARATIVE EXAMPLE)

The pigment preparation obtained from example 11a is incorporated in accordance with example 6b into a powder coating mixture. Inspection after the Mixaco mixer has been emptied reveals a significantly greater level of deposits on the container wall (mixing vessel), on the mixing paddle, and on the dispersion paddle than when using the pigment preparation from example 6a.

EXAMPLE 12a (COMPARATIVE EXAMPLE)

The procedure of example 6a is repeated, but replacing the barium sulfate by 67.5 parts of marble having a mean particle diameter of 0.9 μm (Calcigloss-GU from Omya GmbH, Cologne). Determination of the primary particle size distribution reveals a mean particle size ($d_{50\%}$) of 0.250 μm.

EXAMPLE 12b (COMPARATIVE EXAMPLE)

The pigment preparation obtained from example 12a is incorporated in accordance with example 6b into a powder coating mixture. Inspection after the Mixaco mixer has been emptied reveals a significantly greater level of deposits on the container wall (mixing vessel), on the mixing paddle, and on the dispersion paddle than when using the pigment preparation from example 6a.

EXAMPLE 13a (COMPARATIVE EXAMPLE)

The procedure of example 6a is repeated, but replacing the barium sulfate by 67.5 parts of talc having a mean particle diameter of 1.1 μm (Talk A-3 from Naintsch Mineralwerke, GmbH, Graz, Austria).

EXAMPLE 13b (COMPARATIVE EXAMPLE)

The pigment preparation obtained from example 13a is incorporated in accordance with example 6b into a powder coating mixture. Inspection after the Mixaco mixer has been emptied reveals a significantly greater level of deposits on the container wall (mixing vessel), on the mixing paddle, and on the dispersion paddle than when using the pigment preparation from example 6a.

EXAMPLE 14a (COMPARATIVE EXAMPLE)

The procedure of example 6a is repeated, but replacing the barium sulfate by 67.5 parts of dolomite having a mean particle diameter of 2.5 μm (Microdul Super from Omya GmbH, Cologne). Determination of the primary particle size distribution reveals a mean particle size ($d_{50\%}$) of 0.229 μm.

EXAMPLE 14b (COMPARATIVE EXAMPLE)

The pigment preparation obtained from example 14a is incorporated in accordance with example 6b into a powder coating mixture. Inspection after the Mixaco mixer has been emptied reveals a significantly greater level of deposits on the container wall (mixing vessel), on the mixing paddle, and on the dispersion paddle than when using the pigment preparation from example 6a.

The invention claimed is:

1. A powder coating composition comprising a carboxylated polyester resin and a colorant composition consisting essentially of 70–90 wt. % C.I. Pigment Red 170 (C.I. No. 12475) and 10–30 wt. % barium sulfate.

2. The powder coating composition as claimed in claim 1, wherein the colorant composition has a particle size distribution ($d_{50\%}$) of between 0.1 μm and 1.5 μm.

3. A process for preparing the powder coating composition as claimed in claim 1, comprising the steps of adding the barium sulfate before or during the preparation of the C.I. Pigment Red 170 to form the colorant composition, homogenizing the colorant composition and mixing the colorant composition with the carboxylated polyester resin.

4. The process as claimed in claim 3, wherein the adding step further comprises adding the barium sulfate during the synthesis of the C.I. Pigment Red 170 and/or immediately before, during and/or immediately after a finish of C.I. Pigment Red 170 crude pigment.

5. The process as claimed in claim 4, wherein the adding step further comprises adding the barium sulfate is added after the finish of the C.I. Pigment Red 170 crude pigment but before the C.I. Pigment Red 170 crude pigment is dried.

6. The process as claimed in claim 3, wherein the barium sulfate has a particle size distribution ($d_{50\%}$) of between 0.1 μm and 10 μm.

7. The powder coating composition as claimed in claim 1, wherein powder coating composition further comprises a binder other than the carboxylated polyester resin.

8. The powder coating composition as claimed in claim 7, wherein the powder coating composition includes at least one additive and wherein the binder includes a curing agent, wherein the binder is selected from the group consisting of epoxy resins, polyester resins, polyurethane resins, acrylate resins, and combinations thereof, and wherein the at least one additive is selected from the group consisting of shading dyes, surfactants, fillers, charge control agents for controlled setting of the electrostatic charge, dispersants, standardizers, waxes, defoamers, antidust agents, extenders, preservatives, rheology control additives, wetting agents, antioxidants, UV absorbers, light stabilizers, antistats, lubricants and devolatilizers.

* * * * *